H. KENDIG.
SAFETY HANGER FOR BRAKE BEAMS.
APPLICATION FILED JUNE 24, 1914.

1,178,730.

Patented Apr. 11, 1916.
3 SHEETS—SHEET 1.

Witnesses
L. B. James
Dorothy Lusby

Inventor
Herman Kendig
By Geo. W. Lub
Attorney

H. KENDIG.
SAFETY HANGER FOR BRAKE BEAMS.
APPLICATION FILED JUNE 24, 1914.

1,178,730.

Patented Apr. 11, 1916.
3 SHEETS—SHEET 2.

Witnesses
L. B. James
Dorothy Lusby

Inventor
Herman Kendig
By Geo. W. Lub.
Attorney

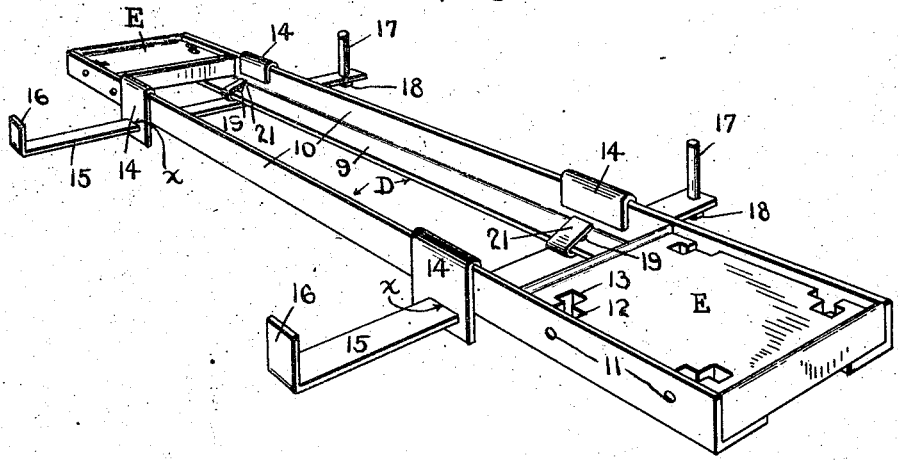
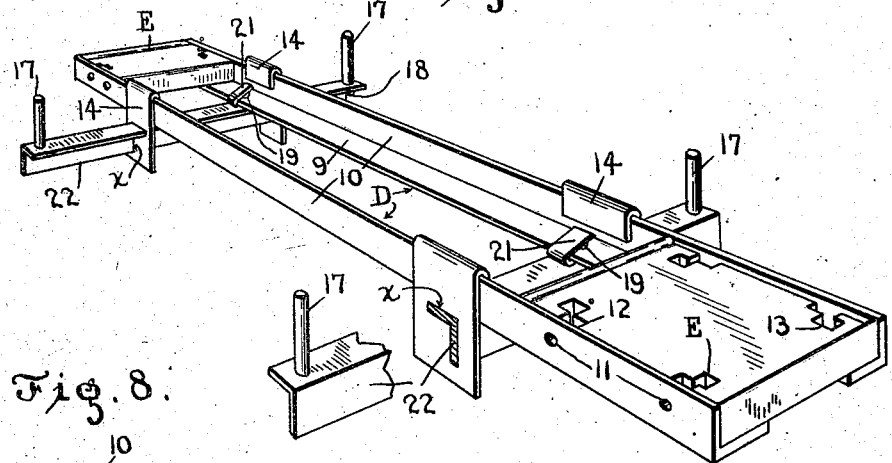
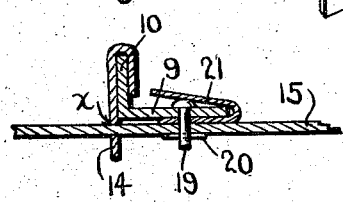

UNITED STATES PATENT OFFICE.

HERMAN KENDIG, OF CLIFTON FORGE, VIRGINIA.

SAFETY-HANGER FOR BRAKE-BEAMS.

1,178,730.  Specification of Letters Patent.  Patented Apr. 11, 1916.

Application filed June 24, 1914. Serial No. 847,029.

*To all whom it may concern:*

Be it known that I, HERMAN KENDIG, a citizen of the United States, and a resident of Clifton Forge, Alleghany county, Virginia, have invented certain new and useful Improvements in Safety - Hangers for Brake-Beams, of which the following is a specification, reference being had to the accompanying drawings, forming a part of this specification.

This invention has relation to certain novel improvements in safety hangers employed in connection with freight cars and engine tanks; the primary object being to provide a simply constructed, readily attachable safety mechanism arranged to catch and support a brake beam when the same becomes detached, preventing the beam from falling on the rails.

Another object is to provide a special means for connecting a safety hanger to the spring seat frame of a conventionally constructed freight car.

With these and other objects in view, the present invention consists in the combination and arrangement of parts as will be hereinafter more fully described and finally pointed out in the appended claims, it being further understood that changes in the specific structure shown and described may be made within the scope of the claims, without departing from the spirit of the invention.

Figure 1:
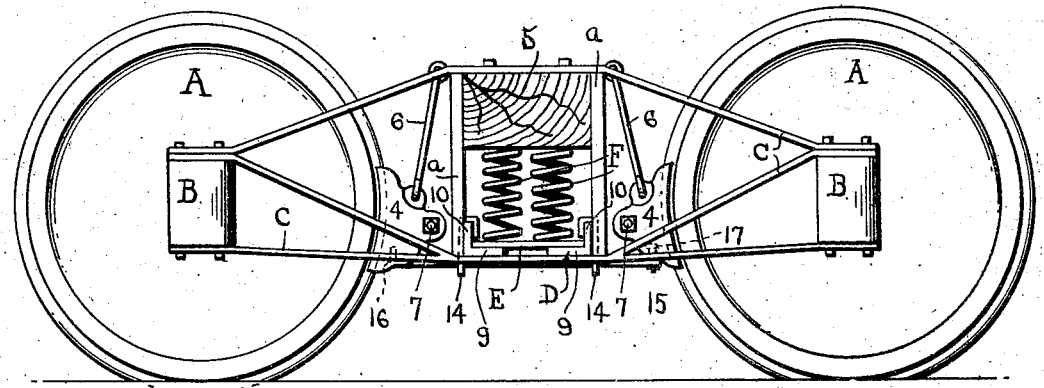
Figure 2:
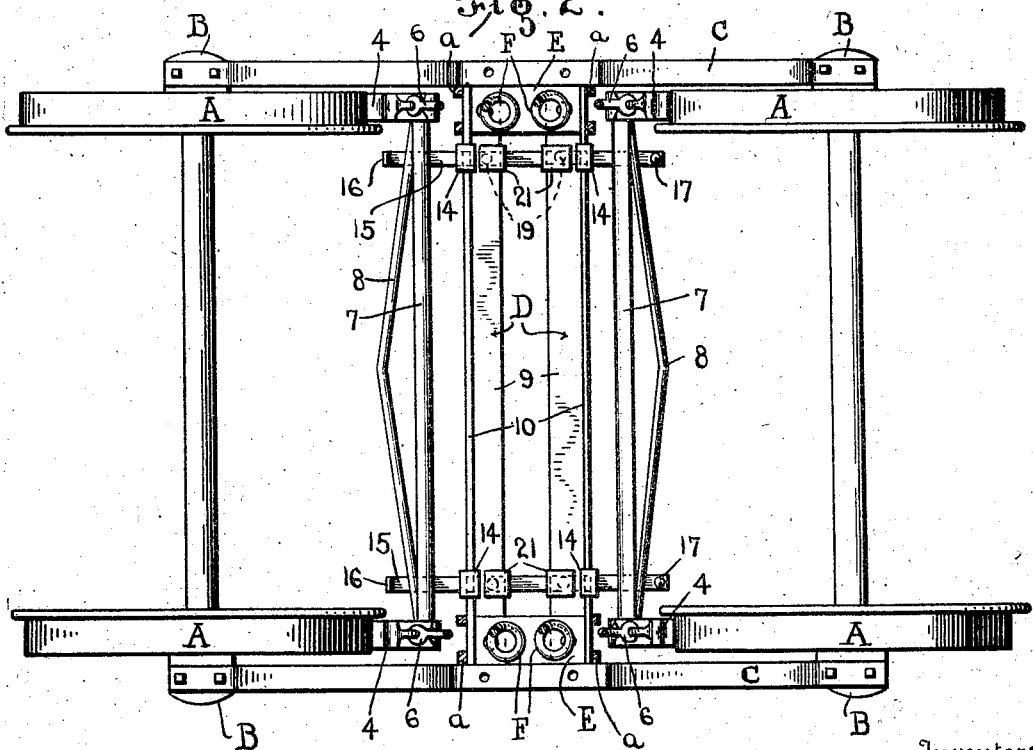
Figure 3:
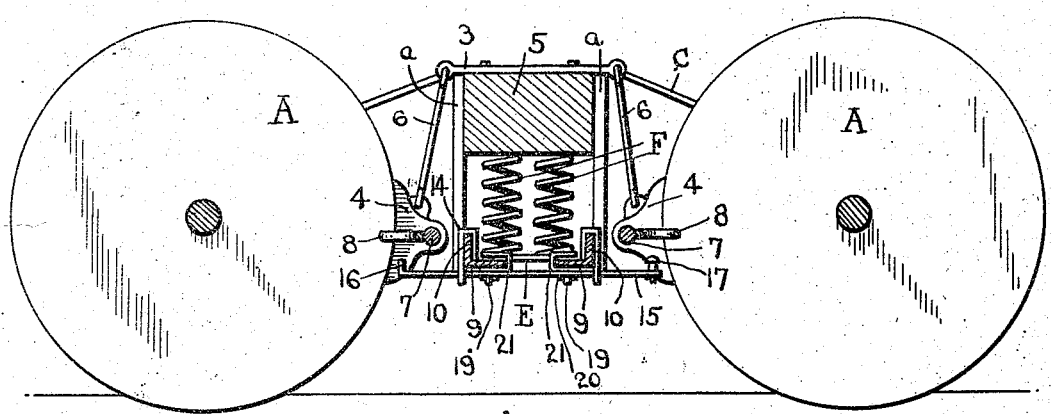
Figure 4:
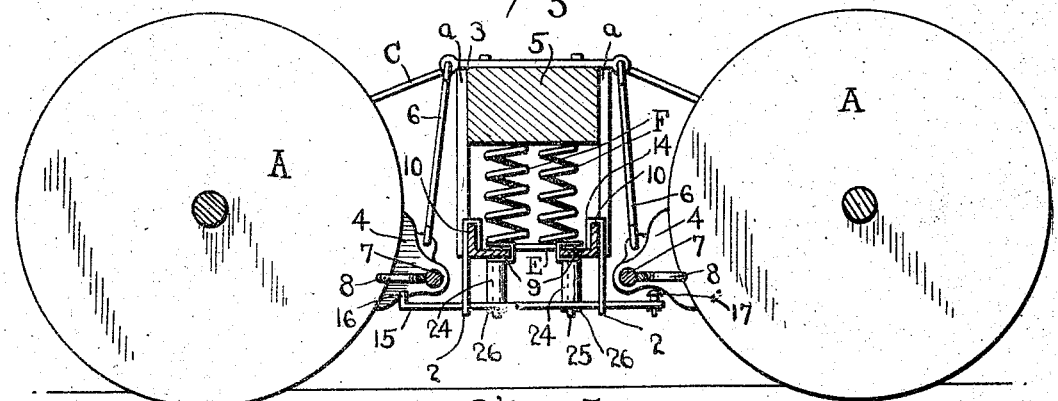
Figure 5:
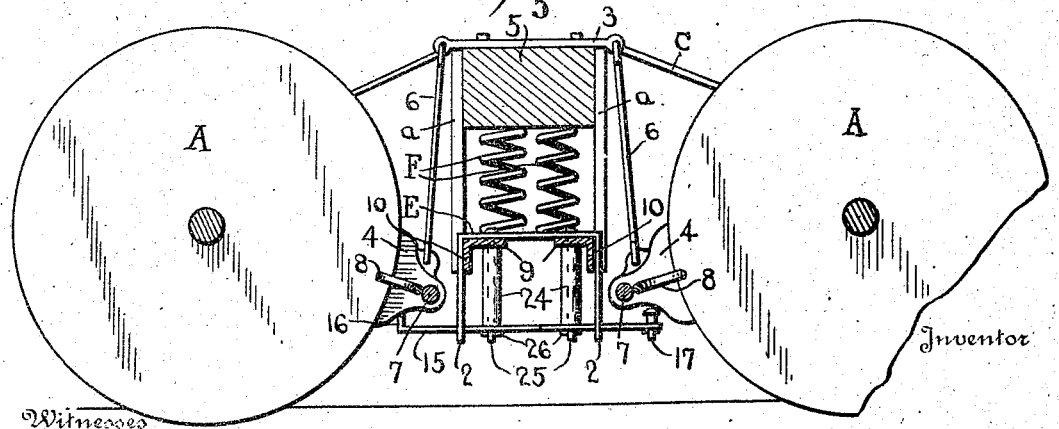

In the accompanying drawings forming a part of this specification, and in which like numerals of reference indicate similar parts in the several views: Figure 1 shows a side view of a freight car truck in which the brake beam is held above the spring seat. Fig. 2 is a top view of Fig. 1 with parts removed. Fig. 3 shows a transverse sectional view of a modification. Fig. 4 shows a modification in which the brake beams are carried below the spring seat, a spring seat frame being shown in which the flanges extend upward. Fig. 5 shows a modification in which the spring seat frame has its flanges directed downward, the brake beams being carried below the spring seat. Fig. 6 shows a perspective view of a spring seat frame with the connected spring seats showing a safety hanger made of flat metal in position. Fig. 7 shows a perspective view of a spring seat frame disclosing a safety hanger made of angle iron. Fig. 8 shows the method of securing the pins holding the safety hangers to the brackets.

A great many freight train wrecks have been caused owing to the brake beams, which are subject to great strain, becoming detached from the trucks and falling upon the rails. In my present invention, I provide a safety hanger arranged to be secured below the brake beams of freight cars of conventional construction, the device not being applicable to car trucks of special design.

In Figs. 1 to 5 inclusive I show my safety hanger as attached to a truck of conventional construction and in which the wheels are marked A.

In the drawings, the letter A designates the car wheels, B the boxings, C the conventionally constructed diamond frame, while the letter D generally designates the angle iron spring seat frame as usually employed in connection with a certain class of freight cars.

As shown in Fig. 6 the spring seat frame comprises two parallel held angle iron members, including the base flanges 9 and the side flanges 10. These members are secured at their ends by means of the spring seats E, which are usually square iron plates or blocks having bolt operings 12 and 13, so that the spring seats can be properly secured to the angle iron members and the springs F, in turn to the spring seats. These springs F carry a bolster 5, the spring seat frame being held to the bolster by means of suitable side bars *a.* Secured to the bolster 5 is a supporting bar 3 from the ends of which depend the brake beam hangers 6 which have their lower ends secured to the brake shoes 4, to which the brake beams 7 are connected, these brake beams 7 being strengthened by means of a brace rod 8, as more clearly shown in Fig. 2.

In the operation of the brakes it is no unusual thing for a hanger 6 or supporting bar 3 to give way, permitting a brake beam 7 with its connected brace rod 8 falling upon the rail, thereby causing a wreck.

In my invention I provide a catch bar 15 having upstanding ends, these catch bars being located below the brake beam 7, so that in case a brake beam 7 becomes detached, it will fall upon and be carried by a catch bar 15, these catch bars being used in sets of twos, as shown in Figs. 2, 6 and 7. These catch bars 15 may be in the form of a flat metal bar, as shown in Fig. 6, or be in the form of an angle iron 22, as shown in Fig. 7.

In connection with a certain class of cars, the brake beams 7 are held above the spring seats E, as shown in Fig. 1 for instance, and where this is the case, the catch bars 15 are held against the under face of the spring seat frames. As shown in the drawing, the spring seat frame includes two parallel side members comprising the base flanges 9, 9 and the side flanges 10. In some classes of cars these flanges 10 extend upward, as shown in Figs. 3 and 4, while in connection with other classes of cars the vertical flanges extend downward, as shown in Fig. 5.

Where the flanges extend upward, as shown in Fig. 6, for instance, the catch bars 15 are held against the under faces of the base flanges 9, by means of suitable brackets 14, which are preferably made of strap metal. As shown, these brackets are used in sets of twos, each having an opening of a size to snugly receive a catch bar. The openings x which are indicated in Figs. 6, 7 and 8 are so located that when the brackets 14 are in position and carry a catch bar 15, the bars will be held against the under face of the spring seat frame. As shown in Fig. 6 one end 16 of each catch bar 15 is bent upward, the opposite end being straight, in order to facilitate shoving the catch bar through the openings x. After the bars have been placed in position, a stud 17 is secured to the opposite ends by means of a suitable nut 18, so that each catch bar 15 has an upturned end. As shown in Figs. 3, 4 and 5, these catch bars 15 extend below the brake beams 7, so that in case these brake beams drop they will fall upon the catch bars and be prevented from slipping off by means of the upturned ends 16 and 17.

To hold the catch bars to the frames, I provide the base flanges 9, as well as the catch bars 15, with the apertures through which extend suitable pins 19, as shown in Fig. 8, these pins being held by means of a cotter pin 20. In order to give further security to these pins 19, I provide a keeper in the form of a sheet metal strip 21 having an opening to receive a pin 19. The apertured end of this keeper 21 is located between a base flange 9 and a carrying bar 15, as shown in Fig. 8, the other end then being bent over and made to rest upon the head of the pin, as clearly shown in Figs. 6, 7 and 8. By this means these pins 18 are securely locked within their seats and can only be removed after the member 21 has been bent away.

In Fig. 7 I show a modification in which the catch bar is in the form of an angle iron 22, arranged to pass through an L-shaped slot x, within the hangers 14, the carrying bar 22 being provided with an upstanding stud 17.

Where the brake beams are located below the spring seat E, as is the case in connection with certain cars, the catch bar 15 must be held below the spring seat frame so as to properly catch the brake beams in case of casual detachment. Where this is necessary, I provide brackets of considerable length and these brackets hold the bars 15 in the manner described. In order to hold the catch bars 15 in parallel spaced relation to the spring seat frame, I employ suitable bolts 25, which pass through tubes 24, these tubular members being interposed between the under face of the carrying frame and the upper face of a catch bar, as shown in Fig. 5. Where the flanges extend downward, as shown in Fig. 5, the bracket may be in one piece. These catch bars can be readily attached to any freight car truck of conventional construction, by simply providing the angle iron spring seat frame with four openings to receive the pins 19, insuring the catch bars being properly held to the spring seat frame. The members 19 are secured by means of the cotter pins 26 shown in Figs. 4 and 5.

Should a brake beam become detached from a truck provided with my safety hanger, the beams would simply drop upon the catch bars and in certain instances, the brake could even be operated while the beam is carried upon the safety hanger.

The attachment of these safety hangers may be effected in any suitable workmanlike manner, no special machine being required.

The device is simple and inexpensive in construction and both durable and efficient in operation, and can be attached to an angle iron spring seat frame, with ease, accuracy and despatch.

Having thus described my said invention what I claim as new and desire to secure by U. S. Letters Patent is:

1. In a device of the character described, a spring seat frame including parallel side and base flanges, each base flange having an aperture, oppositely positioned brackets depending from said vertical flanges having suitable openings, a catch bar passing through the openings within said brackets having upstanding ends said catch bar having apertures registering with said flange apertures, a bolt passing through each set of apertures, and a keeper made of pliable material having an aperture to receive said bolt, the upper end of said pliable member being bent over and resting upon the top of said bolt, as and for the purpose set forth.

2. In a device of the character described, a spring seat frame including parallel side and base flanges, oppositely positioned brackets depending from said vertical flanges having suitable openings, a catch bar passing through the openings within said brackets having upstanding ends, and means to hold said catch bar to said bracket.

In testimony whereof I affix my signature, in the presence of two witnesses.

HERMAN KENDIG.

Witnesses:
C. P. NAIR, Jr.,
R. J. WERNER.